(12) United States Patent
Paielli

(10) Patent No.: US 11,333,209 B1
(45) Date of Patent: May 17, 2022

(54) CONTROL AND DIAGNOSTIC METHOD FOR A DIFFERENTIAL SYSTEM

(71) Applicant: Dana Heavy Vehicle Systems Group, LLC, Maumee, OH (US)

(72) Inventor: Perry M. Paielli, Sand Creek, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 17/138,516

(22) Filed: Dec. 30, 2020

(51) Int. Cl.
*F16D 48/06* (2006.01)
*F16H 48/22* (2006.01)
*F16H 48/34* (2012.01)
*B60W 30/18* (2012.01)
*B60W 30/184* (2012.01)

(52) U.S. Cl.
CPC .......... *F16D 48/064* (2013.01); *F16H 48/22* (2013.01); *F16D 2500/1023* (2013.01); *F16D 2500/10425* (2013.01); *F16D 2500/3021* (2013.01); *F16D 2500/30426* (2013.01); *F16D 2500/5108* (2013.01); *F16D 2500/7042* (2013.01); *F16D 2500/70418* (2013.01)

(58) Field of Classification Search
CPC .......... F16D 48/064; F16D 2500/1023; F16D 2500/10425; F16D 2500/3021; F16D 2500/30426; F16D 2500/5108; F16D 2500/70418; F16D 2500/7042; F16H 48/22; F16H 48/30; F16H 2048/343; B60W 2510/125; B60W 2510/0275; B60W 30/184; B60W 30/18172; B60W 2710/025; B60W 2710/027

See application file for complete search history.

(56) References Cited

U.S. PATENT DOCUMENTS

| | | | | |
|---|---|---|---|---|
| 4,966,250 | A | * 10/1990 | Imaseki | B60K 23/0808 180/197 |
| 5,860,889 | A | 1/1999 | Schlosser et al. | |
| 7,549,941 | B2 | * 6/2009 | Boddy | B60W 30/02 192/48.4 |
| 8,043,184 | B2 | 10/2011 | Boddy | |
| 9,657,786 | B2 | 5/2017 | Larkin et al. | |
| 11,105,406 | B2 | * 8/2021 | Boudreau | F16H 48/22 |
| 2016/0229290 | A1 | * 8/2016 | Chimner | B60K 23/0808 |
| 2017/0089439 | A1 | * 3/2017 | Monticello | F16H 48/22 |
| 2021/0053549 | A1 | * 2/2021 | Chen | B60W 10/08 |

* cited by examiner

*Primary Examiner* — Tinh Dang
(74) *Attorney, Agent, or Firm* — McCoy Russell LLP

(57) ABSTRACT

Methods and systems for a differential assembly are provided herein. In one example, a method is provided that includes operating a clutch motor coupled to a differential locking clutch to place the differential locking clutch in a locked configuration. The method further includes, after the differential locking clutch is placed in the locked configuration, reducing electric power delivered to the clutch motor at a first rate and increasing the electric power delivered to the clutch motor when it is determined that clutch disengagement is occurring based on outputs from a motor position sensor or outputs from shaft speed sensors coupled to a pair of shafts coupled to the differential locking clutch.

20 Claims, 6 Drawing Sheets

CONTROL AND DIAGNOSTIC METHOD FOR A DIFFERENTIAL SYSTEM

TECHNICAL FIELD

The present disclosure relates to a control and diagnostic strategy for a locking clutch and an actuation assembly in a differential system.

BACKGROUND AND SUMMARY

Vehicle differentials permit speed differentiation between axles shafts or drive axles in the case of interaxle differentials (IADs). Both types of differentials have made use of locking devices to selectively prevent speed differentiation in the differential to increase vehicle traction when the vehicle experiences low traction conditions. The locking devices may be activated by a vehicle operation in anticipation of travel into low traction environments.

U.S. Pat. No. 8,043,184 B2 to Boddy discloses a differential system with a hydraulically actuated locking clutch that is actuated by an electronic solenoid. During clutch actuation, the electronic solenoid is energized using a multistage strategy. During a first stage an engagement, current delivered to the solenoid fully engages the clutch. In a second stage a steady state current maintains clutch engagement. Specifically, when fast engagement is needed the current delivered to the solenoid during the first stage is larger than the subsequent holding stage.

The inventor has recognized several drawbacks with Boddy's techniques for locking clutch activation as well as other locking clutch engagement strategies. The steady state clutch holding current may be higher than needed to maintain clutch engagement. However, previous differential systems may present difficulties with regard to the determination of the clutch's holding current threshold. For instance, modeling the amount of current needed to sustain locking clutch engagement, may be inaccurate. These inaccuracies may result in the clutch slipping when engagement is desired or the use of an inordinately high hold current used to sustain clutch engagement and avoid clutch slip. Consequently, the system's energy efficiency may drop.

To overcome at least some of the aforementioned challenges a method for operating a locking clutch in a differential is provided. In one example, the method includes operating a clutch motor coupled to a differential locking clutch (e.g., an IAD locking clutch) to place the differential locking clutch in a locked configuration. The method further includes, after the differential locking clutch is placed in the locked configuration, reducing electric power delivered to the clutch motor at a first rate. The method additionally includes increasing the electric power delivered to the clutch motor. The electric power is increased when it is determined that clutch disengagement is occurring based on outputs from a motor position sensor and/or outputs from shaft speed sensors coupled to a pair of shafts attached to the differential locking clutch. In this way, the locking clutch's holding power may be reduced to increase actuation efficiency and more generally driveline efficiency.

In another example, the power delivered to the clutch motor is increased when the outputs from the motor position sensor indicate the clutch motor is rotating backwards toward an initial clutch engagement point. In such an example, the motor position sensor is coupled directly to the clutch motor. In this way, the electric power can be reduced until it is confidently determined, via a sensor directly attached to the motor, that the clutch disengagement has started. In this way, energy used for clutch engagement can be conserved until the clutch begins to release. Thus, electrical power may be cyclically reduced and increased using clutch disengagement as the inflection point between the decrease and increase in electric power.

In another example, the method includes, after the electrical power delivered to the clutch motor is increased and the differential locking clutch is in the locked configuration reducing the power delivered to the clutch motor at a second rate. In this example, the second rate is less than the first rate. In this way, the reduction in electrical power delivered to the clutch is slowed to reduce the number of times the clutch begins to disengage and increase locking clutch performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An interaxle differential (IAD) system control and diagnostic strategy is described herein. Although, these strategies are directed to an IAD, it will be appreciated that the strategies may be applicable to other types of differentials. The differential control strategy described herein is directed to an actuation assembly for a locking clutch that includes an electric motor. During clutch engagement, the electric power delivered to the motor is decreased, after the clutch is initially locked, and then increased when clutch disengagement is sensed. In this way, the holding power used to sustain clutch locking is reduced until a disengagement point is reached. This electric power reduction scheme may be cyclically implemented and the rate at which the power is reduced may be iteratively decreased, to lower the number of times the disengagement point is reached. In one example, a motor position sensor coupled directly to the actuator motor may be used to ascertain when the clutch begins to disengage. For instance, when the motor position indicates that the motor output shaft is rotating back towards a kiss point of clutch engagement, the electric power delivered to the clutch may be increased. In another example, speed sensors attached to the shafts that are coupled to the clutch plates, may be used to determine when clutch disengagement has begun. For example, when the speeds of the shafts begin to deviate, it may be determined that clutch disengagement has started. This allows clutch disengagement to be confidently determined and subsequently used to implement an efficient clutch holding strategy.

The diagnostic strategy utilizes sensor signals from a motor position sensor to ascertain locking clutch and actuator functionality. For clutch diagnostics, the motor sensor is used to determine an initial engagement position of the clutch, referred to as a kiss point. This kiss point value may be calculated and then stored for reference. Next a motor position for the clutch's lock point (e.g., fully engaged configuration) is determined when the motor speed drops to a stall level or the two shafts attached to the clutch rotate at a similar speed. A variance between the lock point and kiss point motor positions can be used to judge if the clutch has been degraded (e.g., worn or not functioning as wanted). Further diagnostic approaches involve, detecting motor speed when clutch engagement is initiated. If the motor speed does not drop within a predetermined amount of time or does not achieve a predetermined speed within a set time, components in the actuation assembly such as a gear reduction or a ball ramp actuator are degraded. Responsive the abovementioned diagnostic determinations, faults (e.g., flags) may be triggered and fault indicators may be activated to alert the vehicle operator or service technician of the degraded component.

Figure 1:
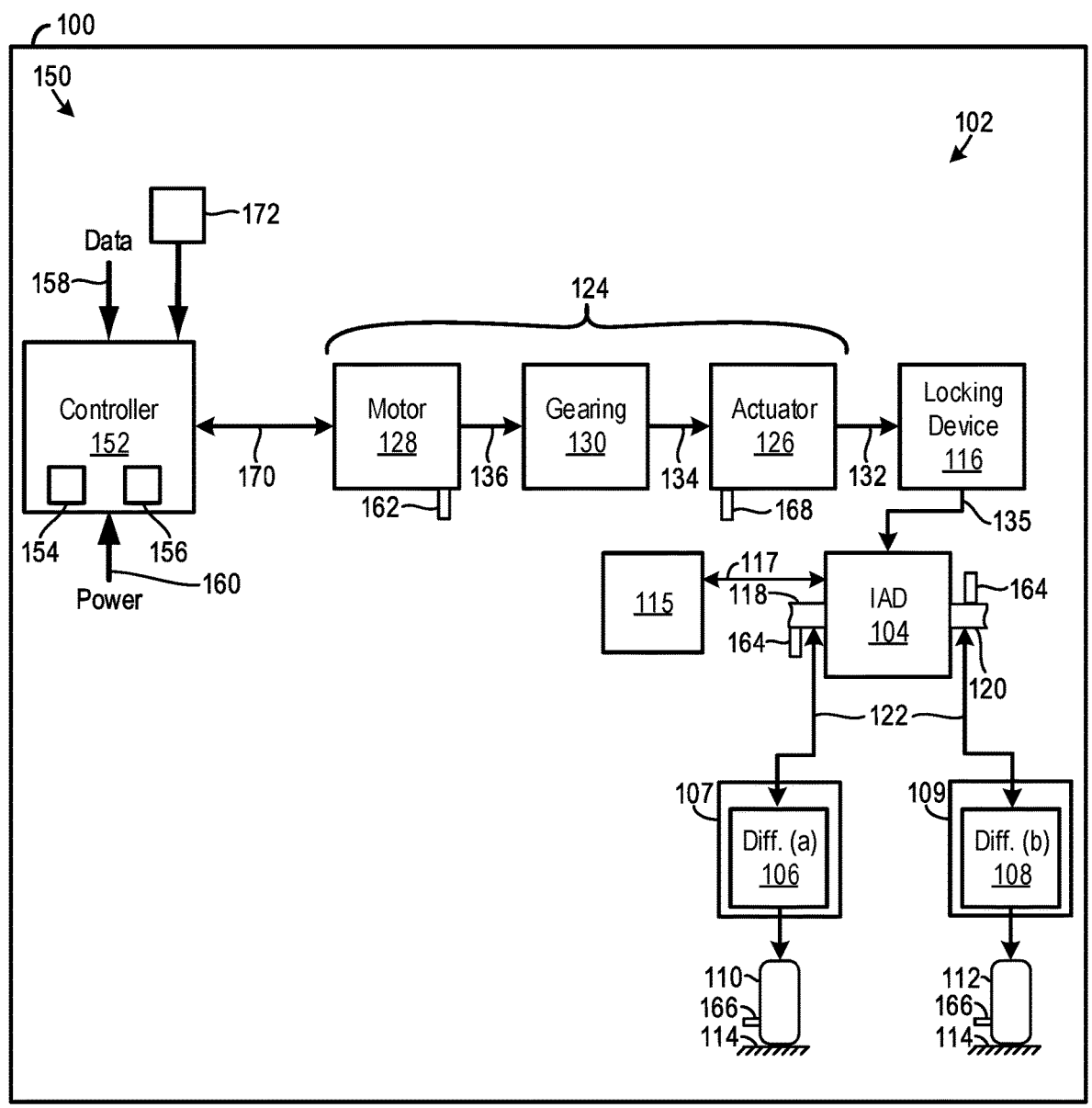
FIG. 1 is a schematic representation of a vehicle including a driveline system with an interaxle differential (IAD).
Figure 2:
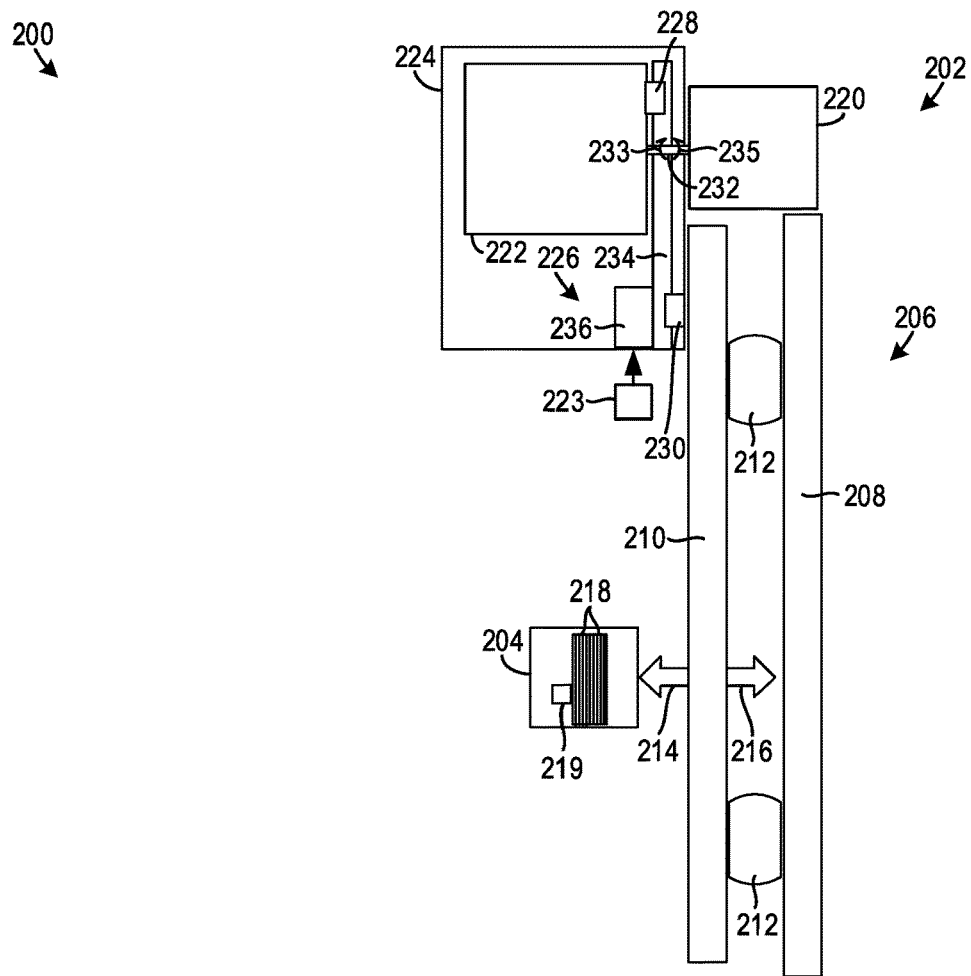
FIG. 2 is an illustration of an actuation assembly for an IAD locking clutch.
Figure 3:
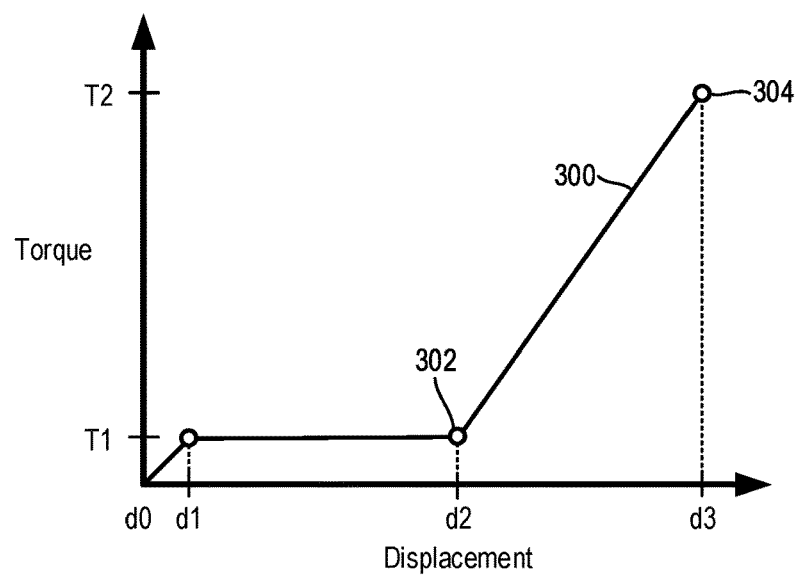
FIG. 3 is a graphical representation of locking clutch operation.

FIG. 1 schematically depicts a vehicle with a driveline system with an IAD and locking clutch designed to be efficiently held in an engaged configuration. FIG. 2 shows a detailed illustration of an example of the driveline system, actuation assembly, and sensor layout for efficient locking clutch engagement. FIG. 3 depicts an exemplary graphical representation of actuator and motor operation during clutch engagement.

Figure 4:
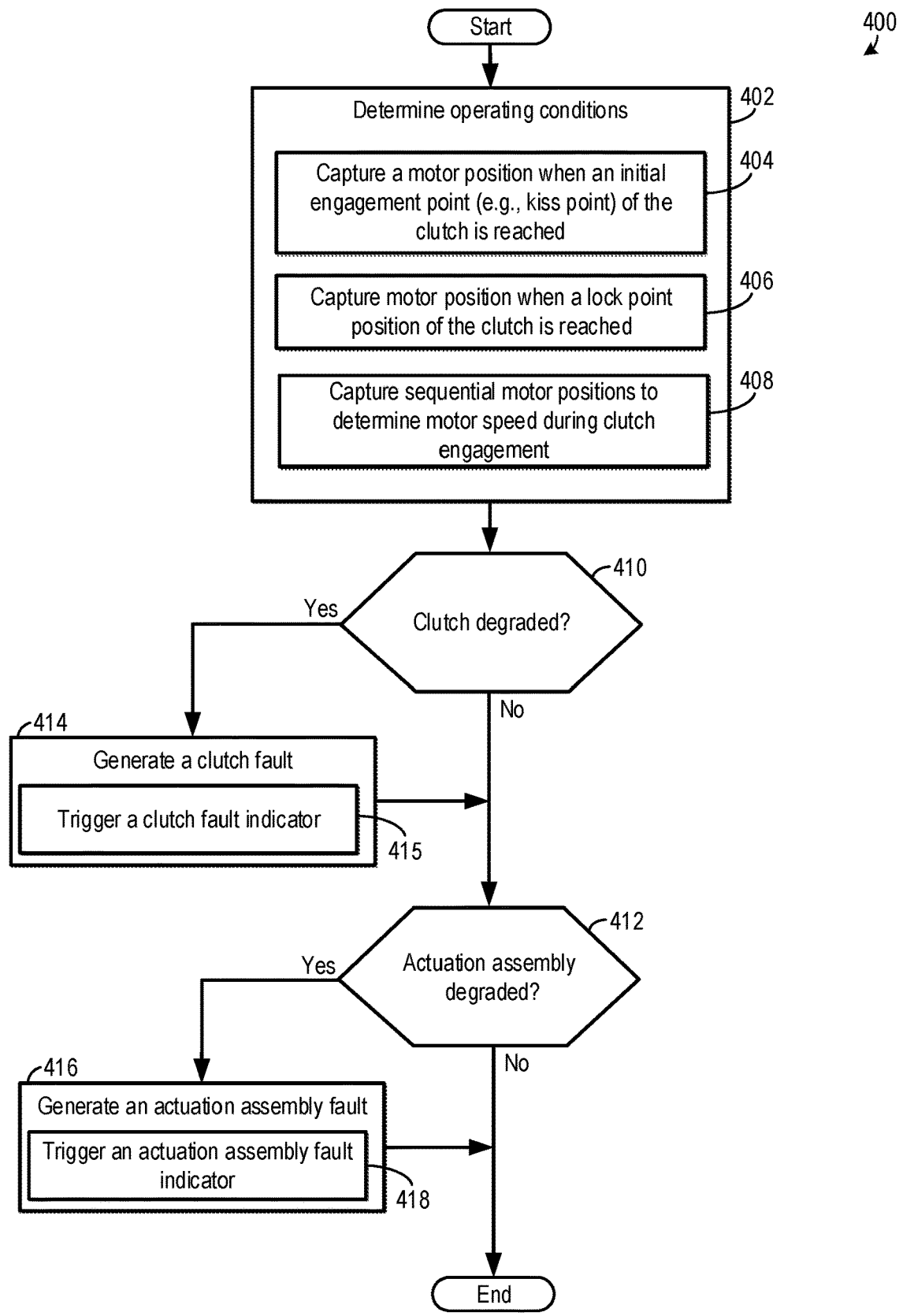
FIG. 4 is a method for controlling and diagnosing a driveline system with an IAD.
Figure 5:
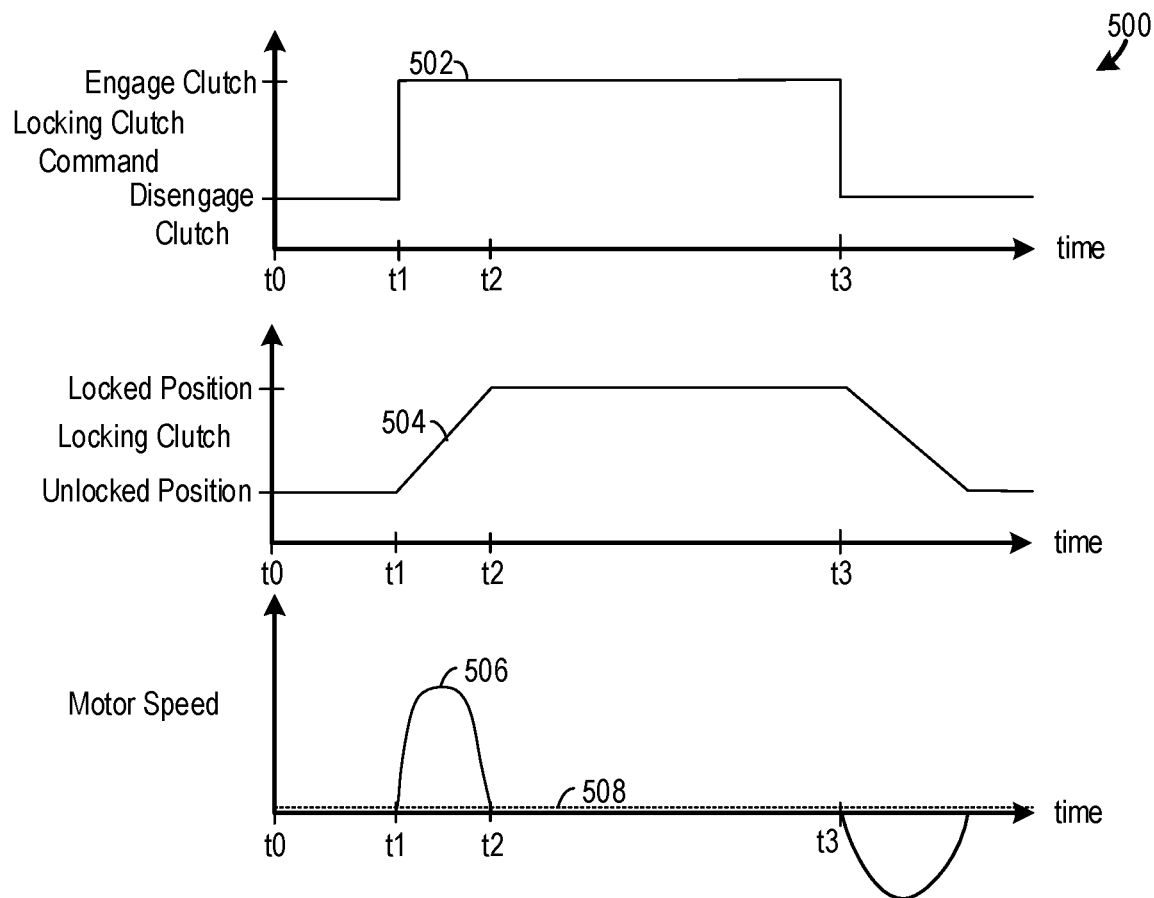
FIG. 5 is a timing diagram of a use-case driveline system control and clutch diagnostic strategy.
Figure 6:
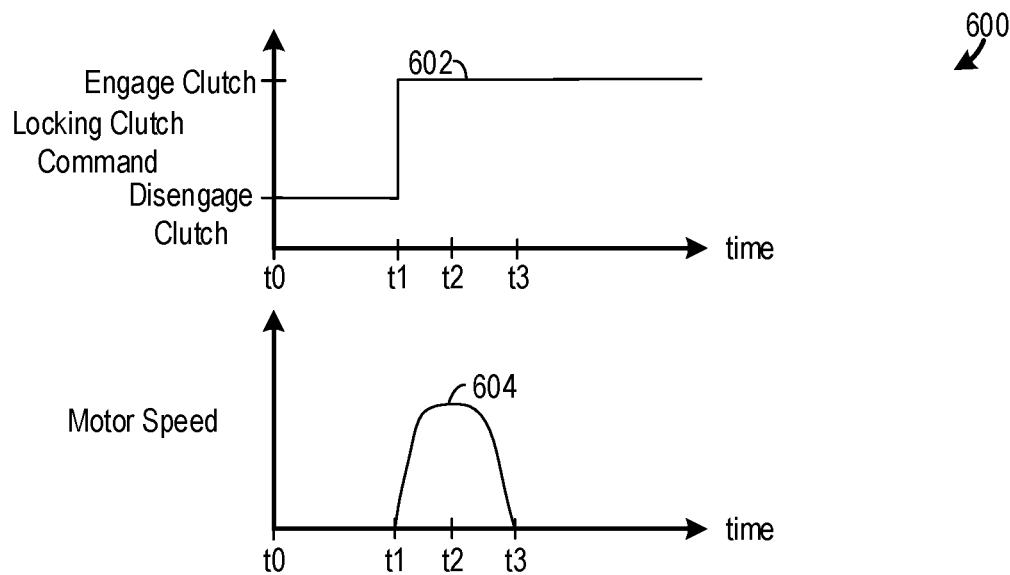
FIG. 6 is a timing diagram of a use-case driveline system control and actuation assembly diagnostic strategy.
Figure 7:
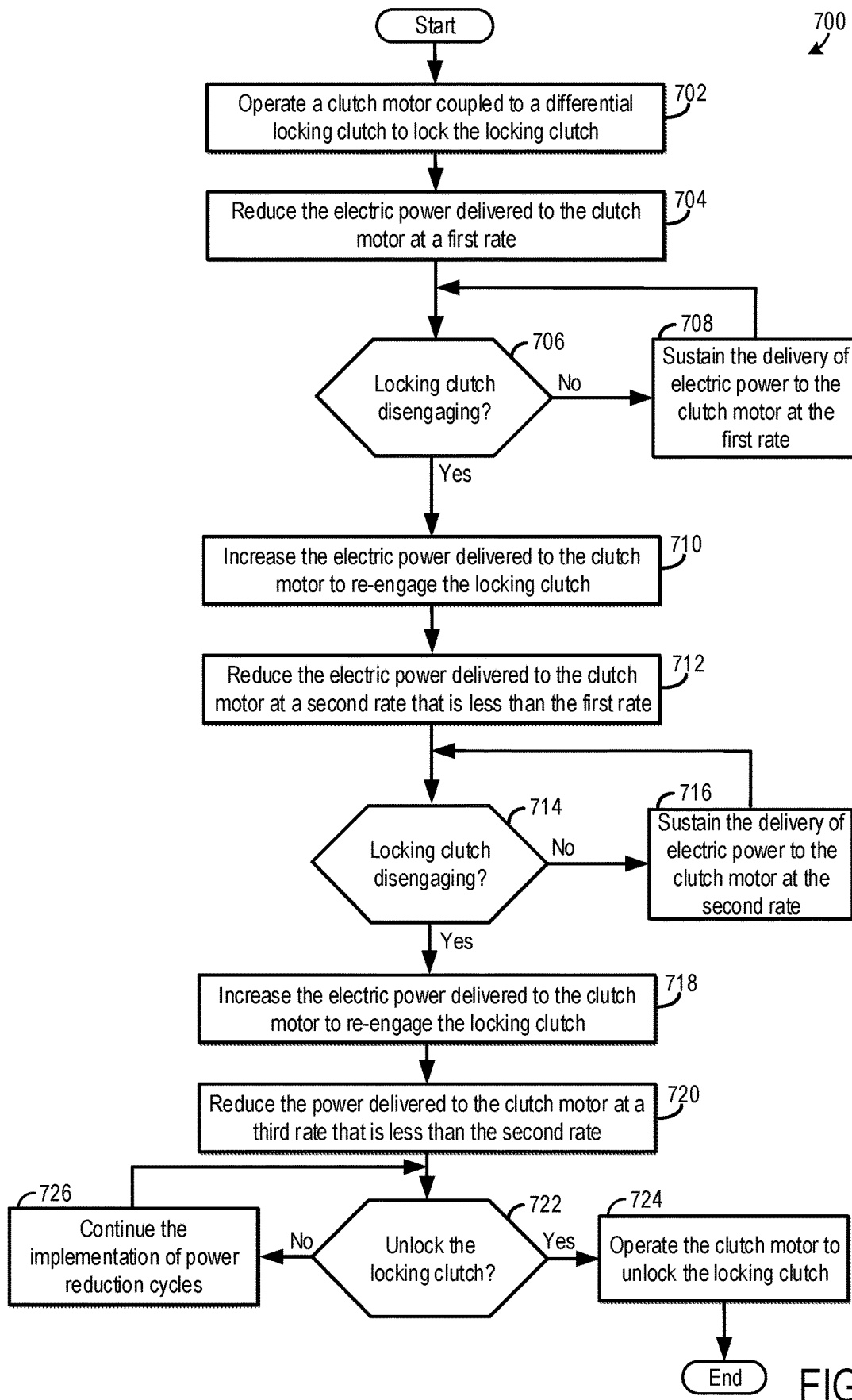
FIG. 7 is a method for controlling a driveline system with an IAD.
Figure 8:
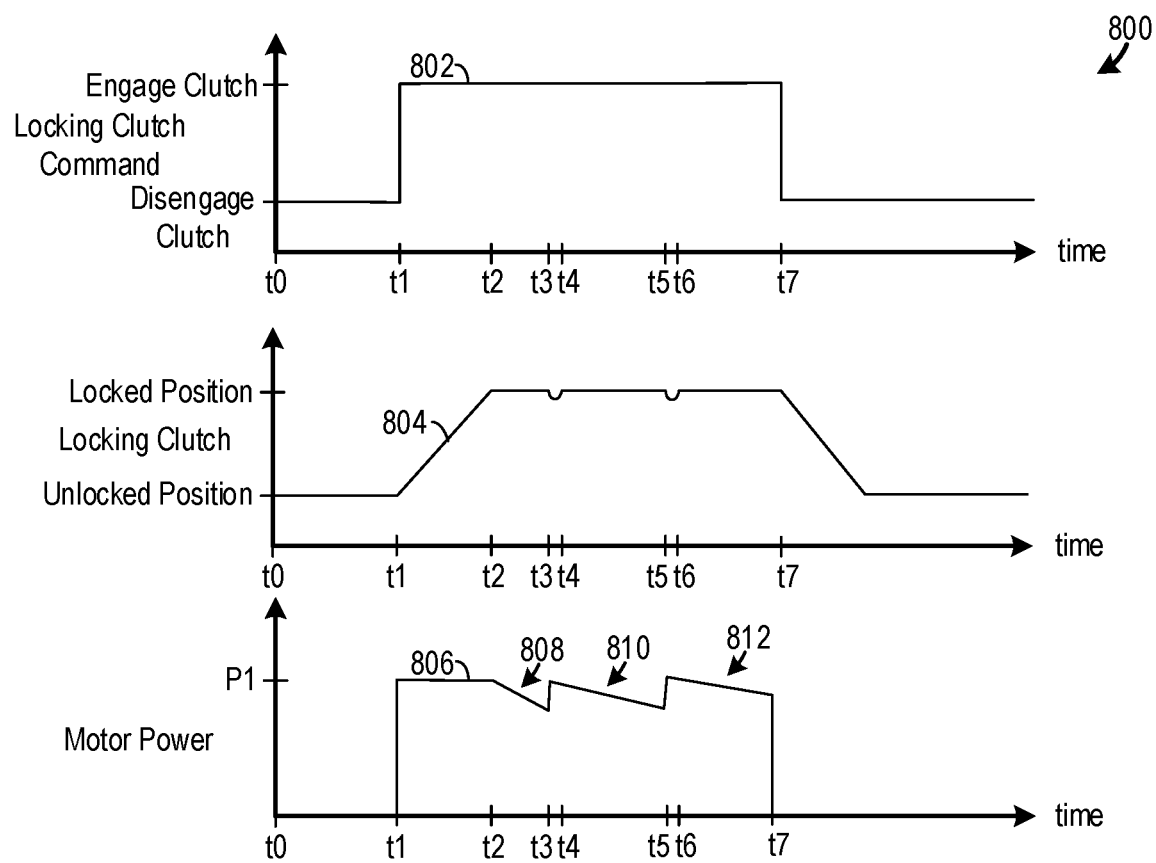
FIG. 8 is a timing diagram of a use-case driveline system control strategy.

FIG. 4 shows a diagnostic strategy for confidently diagnosing clutch and actuation assembly operation. FIGS. 5 and 6 illustrate use-case IAD diagnostic strategies for efficiently diagnosing clutch and actuation assembly degradation. FIG. 7 shows a control strategy for efficiently holding a locking clutch in an engaged state. FIG. 8 illustrates a use-case IAD locking strategy for increasing clutch performance while sustaining clutch engagement.

FIG. 1 shows a schematic depiction of a vehicle 100 with a driveline system 102. The driveline system may include an IAD 104. The IAD 104 may have gears, shafts, an input yoke, a housing, etc. that are designed to transfer power to the axle differentials 106, 108. Thus, the axle differentials are, for example, included in a tandem axle, although alternate axle layouts are possible. In turn, the axle differentials 106, 108 transfer power to drive wheels 110, 112 on road surfaces 114. The IAD is configured to permit speed differentiation between the axle differentials 106, 108 and the axle differentials are configured to permit speed differentiation between axle shafts. Arrangements with side gears, spider gears, pinion gears, planetary gearing arrangements, combinations thereof, and the like may be used to achieve the speed differentiation functionality. The axle differentials 106, 108 are included in drive axles 107, 109, respectively.

A motive power source 115, such as an internal combustion engine, electric motor-generator, combinations thereof, may provide power to the IAD 104 or vice versa, signified via arrow 117. A suitable input interface such as a yoke, a gear, etc., may serve as the mechanical connection between the IAD and upstream components coupled to the motive power source such as a drive shaft. The vehicle 100 may therefore be a hybrid vehicle where both an electric motor-generator and an internal combustion engine are utilized for motive power generation. For instance, in one use-case hybrid vehicle configuration, the internal combustion engine may assist in recharging an energy storage device, during certain conditions. Hybrid vehicles may provide greater efficiency over vehicles that only employ engines. In another vehicle configuration, the internal combustion engine may be configured to solely provide rotational energy to the IAD. Further, in other examples, the vehicle may be a battery electric vehicle (BEV) where the internal combustion engine is omitted. BEVs may have greater maintenance intervals but less range than vehicles that only include internal combustion engines, in some instances.

The driveline system 102 further includes a locking device 116 (e.g., a locking clutch) that permits and inhibits speed differentiation between the axle differentials 106, 108. The locking device 116 and the IAD 104 are schematically depicted as separate components but it will be understood that in practice, the locking device may be formed within the IAD and the locking device may therefore be integrated within the IAD enclosure.

To achieve the speed differentiation locking/unlocking functionality the clutch may include friction plates coupled to shafts 118, 120 in the IAD 104. However, other locking device and IAD arrangements lie within the scope of the disclosure. Further, the clutch may be lubricated by the lubrication assembly integrated within the IAD. The shafts may be rotationally coupled to the axle differentials 106, 108, which is indicated via arrows 122.

The differentials 106, 108 may further include locking devices that permit and inhibit speed differentiation between the axle shafts in the corresponding axles. Electronic and pneumatic types of locking devices for the differentials 106, 108 may, for example, be used.

The driveline system 102 further includes an actuation assembly 124. The components of the actuation assembly may include an actuator 126 (e.g., ball ramp actuator) and a clutch motor 128. The clutch motor 128 may comprise conventional components for the generation of a rotational output such as a rotor, a stator, a housing, bearings, etc.

In certain embodiment, a gearing arrangement 130 may be positioned between the actuator and the clutch motor 128. To elaborate, the gearing arrangement 130 may be rotationally coupled to the clutch motor 128 and the actuator 126. Arrow 132 signifies the mechanical connection between the actuator 126 and the locking device 116. To elaborate, linear displacement of a plate in the actuator may increase and decrease frictional engagement between sets of plates in the locking clutch that are coupled to the shafts 118, 120. Arrow 134 signifies the mechanical connection (e.g., rotational coupling) between the gearing arrangement 130 and the actuator 126. Specifically, a gear in the gear assembly may mesh with an actuation plate in the actuator. Arrow 136 further signifies the mechanical connection between the motor 128 and the gearing arrangement 130. This mechanical connection may be formed by an input gear of the gearing arrangement and a gear on the motor's output shaft that mesh with one another. Further, arrow 135 indicates the mechanical connection between the locking device 116 and the IAD 104. In certain instances, the locking device may be integrated in the IAD.

The gearing arrangement 130 may be a planetary type gear reduction. Using a planetary gear reduction allows the actuation assembly's space efficiency to be increased. However, non-planetary gearing layouts may be used when packaging efficiency is not as favored. The gear reduction enables a smaller motor to be used for actuation in comparison to actuation assembly designs that forgo a gear reduction, if wanted. The gear reduction may further be configured as a non-backdriveable or partially backdriveable gear set. Other types of non-backdriveable gears that may be used in the gearing arrangement include worm gears and cycloidal gears, in other embodiments.

A control system 150 with a controller 152 may further be incorporated in the vehicle 100. The controller 152 includes a processor 154 and memory 156. The memory 156 may hold instructions stored therein that when executed by the processor cause the controller 152 to perform the various methods, control strategies, and diagnostic techniques described herein. The processor 154 may include a microprocessor unit and/or other types of circuits. The memory 156 may include known data storage mediums such as random access memory, read only memory, keep alive memory, combinations thereof, etc. The memory 156 may include non-transitory memory.

The controller 152 may receive vehicle data and various outputs (e.g., signals) from sensors positioned in different locations in the vehicle 100 and the driveline system 102, indicated via arrow 158. Arrow 160 signifies the transfer of electric energy to the controller from an energy storage device, alternator, and the like. The sensors may include a motor position sensor 162, shaft position sensors 164 (e.g., shaft speed sensors), wheel speed sensors 166, clutch position sensor 168, etc. The controller 152 may further send control signals to the motor 128. For instance, the controller 152 may send signals to the motor 128 to adjust the rotational speed and/or direction of motor rotation, indicated via arrows 170. The controller 152 send signals to other controllable components, such as the differentials 106, 108. Alternatively, the controller may solely control the motor. Additionally or alternatively, a vehicle electronic control unit (ECU) may be provided in the vehicle to control other adjustable components such as the engine, the motor-generator, the energy storage device, etc. Furthermore, the control system 150 and specifically the controller 152 with the memory 156 and processor 154 may be configured to carry out the control and diagnostic techniques elaborated upon herein with regard to FIGS. 4-8.

The vehicle 100 may include an input device 172 (e.g., a button, a switch, a touch panel, a touch interface, and the like). The input device 172, responsive to driver input, may generate a mode request that indicates a desired state (e.g., locked or unlocked state) of the IAD locking device. Additionally or alternatively, IAD locking may be initiated programmatically taking into account vehicle operating conditions such as wheel speed, wheel slip, and/or ambient temperature. The input device may be located in a vehicle cabin (e.g., vehicle dash), in some cases.

FIG. 2 illustrates an example of a driveline system 200 with an actuation assembly 202 for an IAD, such as the IAD 104 depicted in FIG. 1. The driveline system 200 illustrated in FIG. 2 is an example of the driveline system 102 depicted in FIG. 1. As such, these driveline systems may share common structural and functional features and redundant description is therefore omitted.

The driveline system 200 further includes a locking clutch (e.g., friction clutch), schematically illustrated at 204, adjusted by the actuation assembly 202. To elaborate, a ball ramp actuator 206 may apply an axial force on plates 218 in the clutch to initiate frictional engagement between sets of clutch plates to place the clutch in a locked configuration. Conversely, the axial force may be released to place the clutch in an unlocked configuration. When locked, the clutch plates and shafts coupled thereto rotate in unison to prevent speed differentiation between drive axles that receive power from the IAD.

The ball ramp actuator 206 includes two plates 208, 210 with balls 212 positioned there between. The plates 208, 210 may include grooves in which the balls reside. These grooves may be ramped to vary the axial position of the balls with regard to the plates. For instance, rotation of the plate 208 in a first direction may push the plate 210 away from plate 208 in direction 214 and rotation of the plate 208 in a second direction, opposite the first direction, axial retracts the plate 210 in direction 216. In this way, the ball ramp actuator 206 converts rotational motion into linear motion which initiates clutch engagement and disengagement. Thus, the linear motion may provide a compression force to the clutch while the clutch is engaged. The plates 218 in the clutch 204 may frictionally engage and disengage during clutch locking and unlocking operation. Springs, schematically illustrated at 219, may be provided in the clutch to push the plates apart once the compression force, exerted by the ball ramp actuator, is released.

The actuation assembly 202 may further include a gear set 220 that provides a gear reduction between a motor 222 and the ball ramp actuator 206. The gear set 220 may be a planetary gear set, to achieve a compact arrangement, as previously discussed, although non-planetary gear arrangements have been contemplated.

The motor 222 includes an output shaft 232 and is designed to rotate the shaft in an engagement rotational direction 233. Conversely, a second rotational direction 235, opposite the engagement rotational direction, may be referred to as a disengagement rotational direction or a backward rotational direction. To accomplish the rotational functionality, the motor may include a rotor electromechanically interacting with a stator, a housing, etc. Further it will be appreciated that the controller 226 may regulate an amount of electric power supplied to the motor from an energy source 223 (e.g., an energy storage device such as a battery, an alternator, and the like).

The gear set 220 is coupled to the motor 222 and therefore receives rotational input therefrom. A housing 224 may enclose the motor 222, a controller 226 (e.g., integrated control unit), and sensors 228, 230. Arranging the motor, controller, and sensors in a common enclosure enables control and sensing latency to be reduced. Consequently, control strategy performance may be increased when compared to driveline systems using remotely located controllers, sensors, and motors. Further, the incorporation of the sensors and controller within the motor enclosure allows reductions in vehicle wiring, fault modes, electromagnetic interference, and calibration maintenance to be achieved.

The sensor 228 coupled to the motor output shaft 232 may be a hall effect sensor, an inductive position sensor, etc. Thus, the sensor may be configured to detect a rotational position of the motor and specifically the motor's output shaft. As such, motor position and speed may be determined using the sensor 228. The sensor 230 may be configured to detect the axial position of the ball ramp actuator 206 and may be an optical sensor, an electromagnetic sensor, and the like. As such, the sensor 230 may be referred to as a clutch position sensor. Further, as shown in FIG. 2, the controller 226 and specifically a printed circuit board arrangement (PCBA) 234 in the controller, may have the motor position sensor 228 incorporated therein to further increase packaging efficiency and reduce sensing latency. Likewise, the sensor 230 may be incorporated in PCBA 234. The clutch position sensor 230 may allow direct clutch position detection, without relying on clutch position derivation through a motor position measurement, thereby increasing the system reliability.

A power and communication interface 236 may be included in the controller 226. The power and communication interface 236 is designed for wired and/or wireless electronic communication. A vehicle electronic control unit (ECU) may send and receive communication signals to/from the controller 226. In this way, different vehicle control units may coordinate diagnostic and/or control strategies. In one exemplary scenario, the communication interface 236 may receive a command to lock or unlock the clutch 204. Such a command may be programmatically generated by the ECU or may be generated in response to operator interaction with an input device. In this way, the operator can manually engage and disengage IAD locking, when desired. Still further in other control scenarios, the controller 226 may automatically generate a command to lock and unlock the clutch 204.

FIG. 3 depicts a plot 300 with motor torque on the ordinate and actuator (e.g., ball ramp actuator) displacement on the abscissa. Although numerical values are not specifically provided on the ordinate and abscissa, motor torque increases in a vertical direction along the ordinate and displacement increases in a lateral direction along the abscissa.

In a first stage of engagement the motor torque and displacement correspondingly increase (e.g., linearly increase) until a first torque T1 and displacement d1 are reached. In a second stage, the displacement increases while the torque remains constant. The torque remains at T1, a comparatively low value, until displacement d2 is reached and the clutch plates begin to contact one another. As such, at displacement d2, an initial engagement point 302 of the clutch is reached. This initial engagement position may be referred to as a kiss point. Once the clutch plates begin to contact one another, mechanical load seen by the motor increases, as the clutch plates compress. When the clutch plates reach a lock point, the plates rotational couple the shafts that are attached to the clutch. Therefore, in a third stage, the displacement increases from d2 to d3 along with an increase in torque from T1 to T2 until a lock point 304 (e.g., fully engaged point) is reached by the clutch. In the locked configuration, the clutch prevents speed differentiation between shafts rotationally coupled to the drive axles. It will be understood that motor position may be correlated to ball ramp actuator displacement. As such, the displacement at the kiss point and the fully engaged point may be expressed as motor position values.

FIG. 4 shows a method 400 for operation of a driveline system. The method 400 may be carried out via any of the driveline systems and components discussed above with regard to FIGS. 1-2. However, the method 400 may be carried out by other suitable systems and components, in other examples. Furthermore, the method 400 may be implemented by a controller that includes a processor and memory, as previously discussed. As such, the method may include receiving inputs from sensors and outputting commands to controllable components.

At 402, the method comprises determining operating conditions. The operating conditions may be determined based on sensor inputs and/or modeling. Determining operating conditions includes step 404. At 404, the method includes capturing a motor position when an initial engagement point (e.g., kiss point) of the clutch is reached. Motor speed may be used to ascertain when the clutch has reached its initial engagement point. For instance, when motor speed starts to significantly drop, signifying a rise in mechanical load on the motor. A predetermined motor speed derivative may be used to determine when the kiss point is reached, although numerous techniques for determining when the clutch has reached its kiss point have been envisioned. When it is determined that the initial engagement point has been reached, the motor's position is captured. In one example, the motor position at the kiss point may be determined once and then stored for subsequent diagnostic routines. In this way, computational resources may be conserved, thereby increasing control system efficiency. Alternatively, the motor position at the clutch's kiss point may be captured multiple times.

Determining operating conditions further includes step 406, where the method includes capturing a motor position when a lock point position of the clutch is reached. A stall level of the motor may be used to determine when the clutch has reached the locked point, in one example. For instance, when the motor speed drops below a threshold value or approaches zero, it may be ascertained that the clutch has reached its lock point. In another example, the speed of the shafts coupled to the clutch may be used to determine when the clutch has reach the locked point. For instance, when the shafts speeds become equivalent or are within a relatively small range, it may be determined that the clutch is in a locked position. Upon determination of the clutch's lock position, the motor position may be captured.

Further, both steps 404 and 406 may be carried out during clutch engagement. Specifically, step 404 may be carried out during a first clutch engagement event different from second clutch engagement event during which step 406 is implemented. Alternatively, both steps 404 and 406 may be implemented during a common clutch engagement event. At 408, the method includes capturing sequential motor position samples to determine motor speed during clutch engagement. Step 408 may be carried out during another clutch engagement event than either steps 404 and/or 406. However, in alternate examples, the motor positions in steps 404, 406, and/or 408 may be captured during one clutch engagement event. A clutch engagement event may be defined as a sequence in which the actuation assembly triggers locking of the plates in the clutch to prevent speed differentiation, holding the clutch in the locked positioned for a duration, and then releasing the clutch to again permit speed differentiation.

At 410, the method determines if the clutch has been degraded. Clutch degradation may be judged based on a variance between the motor position at the initial engagement point and the motor position at the lock point. For instance, a threshold variance may be determined based on manufacturing tolerances and other design parameters that may be established at the time of manufacture. Further, in certain examples, temperature may be accounted for to normalize this threshold. It will be understood, that the variance between the initial engagement point (e.g., kiss point) and the fully engaged point of the clutch is a measure of the clutch's engagement range. As such, an increase in the engagement range may signify a worn clutch and/or the clutch not functioning as desired. In certain examples, the diagnostic routine may include multiple threshold variances. A first threshold variance may correspond to clutch pack wear and a second threshold variance, greater than the first threshold, may correspond to a condition where the clutch actuating mechanism not functioning as designed. However, as discussed in greater detail herein, motor speed may be used to diagnose the ball ramp actuator and the gear set in the actuation assembly.

If it is determined that the clutch has not been degraded (NO at 410) the method advances to 412. Conversely, if a determination is made that the clutch has been degraded (YES at 410) the method moves to 414.

At 414, the method includes generating a clutch fault. The clutch fault may be generated by the controller integrated into the motor enclosure and sent to the vehicle ECU, for instance. Responsive to generating the clutch fault the method may trigger a clutch fault indicator, at 415. Examples of the clutch fault indicator include a visual indicator such as a dash light, a graphic on a user interface, an audio alert in the vehicle cabin, a haptic alert, combinations thereof, etc. Specifically, the clutch fault indicator and/or the other fault indicators described herein may include a service alert. In this way, the vehicle operator may be notified of the clutch's degraded state and take corrective action such as servicing the vehicle.

At 412, the method includes determining if the actuation assembly has been degraded. Such a determination may take into account motor speed during clutch engagement. For instance, a speed profile or speed average over the kiss point to lock point segment may be used to determine actuation assembly degradation. Still further in other examples, the speed profile or average over the open point to kiss point segment may be taken into account when determining actuation assembly degradation. In another example, if the motor speed occurring after initiation of clutch engagement, does not drop within a predetermined amount of time (e.g., 0.1 seconds (s)-1.0 s) or motor rotations the gear reduction assembly or the ball ramp actuator may be diagnosed as degraded (e.g., not operating as desired). In yet another example, the gear reduction assembly or the ball ramp actuator may be diagnosed as degraded when the motor does not achieve a threshold speed within a predetermined time or number of motor rotations. Thus, the rise or fall in motor speed during clutch actuation may be used to diagnose the actuation assembly.

If it is determined that the actuation assembly is not degraded (NO at 412), the method ends. Conversely, if it is determined that the actuation assembly is degraded (YES at 412) the method moves to 416. At 416, the method comprises generating an actuation assembly fault. The fault may again be disseminated from the integrated motor controller to the vehicle ECU. The method further includes at 418, responsive to generation of the actuation assembly fault, activating an actuation assembly fault indicator. Again, the indicator may be a visual, an audio, and/or a haptic indicator that may be included in a vehicle cabin (e.g., vehicle dash). In one example, the diagnostic routine may capture data using solely the motor position sensor and without the use of the clutch position sensor. This data gathering strategy allows the diagnostic strategy to be efficiently carried out and processing resources to be conserved. The diagnostic method 400 allows the clutch and/or upstream actuation devices to be efficiently and confidently diagnosed. The diagnostic techniques further enable a vehicle operator to gain additional vehicle operational data and take actions to increase IAD performance, if desired.

FIG. 5 illustrates a timing diagram 500 of a use-case locking clutch diagnostic strategy for a driveline system, such as the driveline systems, shown FIGS. 1-2. In each plot of the timing diagram, time is indicated on the abscissa. The ordinates for plots 502 and 504 indicate the locking clutch command and locking clutch configuration, respectively. The ordinates for plot 506 indicates motor speed of the motor in the actuation assembly.

At t1, a clutch engagement command is generated or received by the controller. For instance, a vehicle operator may depress an IAD lock button or interact with another suitable interface. However, in alternate examples, the clutch engagement command may be programmatically generated based on vehicle operating conditions such as vehicle speed, wheel traction, ambient temperature, etc.

Responsive to the generation of the clutch engagement command, the locking clutch position moves towards the locked position from t1 to t2. Furthermore, from t1 to t2 motor speed increases, peaks, and then decreases as the clutch plates exert torque on the motor. A stall speed 508 is reached at t2. The stall speed may be 0 revolutions per minute (RPM), in one example.

When the stall speed is reached at t2, indicative of the clutch reaching the engaged position, the motor position may be captured. The motor positioned captured at full clutch engagement is compared with a previously stored value of motor position captured at the clutch's kiss point. The difference between these two motor positions is correlated to the distance between the disengaged and engaged clutch plates. If the difference is greater than a threshold value, the clutch may be reported as worn. Further in some instances, a first threshold value may be indicative of the clutch actuator being degraded and a second threshold, greater than the first threshold, may be indicative of the clutch being worn. In such an example, when the difference between the kiss point motor position and the fully engaged motor position exceeds either threshold, a fault corresponding to the actuator and the clutch may be generated. However, in alternate examples, motor speed may be used for actuation assembly diagnostics, as shown in FIG. 6. At t3 a clutch disengagement command is generated or received by the controller. Further, at t3 the motor is driven in reverse to disengaged the clutch and the clutches position moves back towards the unlocked position subsequent to t3. In this way, the motor may be activated to disengage the clutch due to the gearing being non-backdriveable. However, in other examples, the gear reduction in the clutch assembly may be backdriveable and disengagement may involve the deactivation of motor output.

FIG. 6 illustrates another timing diagram 600 of a use-case actuation assembly diagnostic strategy for a driveline system, such as the driveline systems, shown in FIGS. 1-2. In each plot of the timing diagram, time is indicated on the abscissa. The ordinates for plots 602 and 604 indicate the locking clutch command and motor speed, respectively.

As shown at t1, a clutch engagement command is received and the motor speed increases and decreases, responsive to initiation clutch engagement from t1 to t3. The rate at which the motor speed increases or decreases may be used to determine if the gear reduction or the ball ramp actuator has been degraded. For instance, if the derivative of motor speed from t1 to t2 is less than a threshold value, it may be determined that the gear reduction or ball ramp actuator is degraded. The actuation assembly diagnostic strategy shown in FIG. 6 enables the ball ramp actuator and the gear set to be efficiently and confidently diagnosed using a sensor coupled directly to the actuation assembly motor.

The technical effect of the driveline system and diagnostic techniques described herein is an increase in diagnostic efficiency, an increase in diagnostic confidence, a decrease in clutch controller latency, and a decrease in electromagnetic interference when compared to IAD systems that include a controller spaced away from the IAD actuation subsystem.

FIG. 7 shows a method 700 for operation of a driveline system. The method 700 may be carried out by any of the driveline systems and components discussed above with regard to FIGS. 1-2. However, the method 700 may be carried out by other suitable systems and components, in other examples. Furthermore, the method 700 may be implemented by a controller including a processor and memory, as previously discussed. As such, the method may include receiving inputs from sensors and outputting commands to controllable components.

At 702, the method comprises operating a clutch motor coupled to a differential locking clutch to lock the clutch. For instance, a controller may direct electric power to the motor to induce rotation which in turn drives an actuator (e.g., ball ramp actuator) that linearly engages plates in the clutch. In one example, the diagnostic routines, described in FIGS. 4-6 may be implemented while the clutch is operated to lock the clutch at step 702. To elaborate, the motor positions at the kiss point and the lock point may be captured during steps 702 as well as motor speed to judge if the clutch or actuation assembly has been degraded (e.g., worn or not functioning as wanted). Capturing the diagnostic input data during the clutch's holding control strategy enables the controller's processing resources to be conserved, thereby increasing processing efficiency. Alternatively, the locking clutch diagnostic and control strategies may be carried out at separate times (e.g., distinct clutch actuation events), which may decrease control system efficiency.

Next at 704, the method includes reducing the electric power delivered to the clutch motor at a first rate. For example, the controller may reduce the electric power delivered to the clutch motor from an initial level of power transfer used for clutch engagement. In one example, when the clutch is diagnosed as degraded, the rate at which the power delivered to the clutch is reduced may be adjusted. For instance, the initial rate of power delivery reduction may be decreased when the clutch is diagnosed as degraded. In this way, the chance of the clutch unduly slipping may reduce to increase clutch performance. Further, in some instances, if the level or rate of de-energizing is outside of a reasonable range (e.g., a threshold amount of energy to hold the clutch closed is exceeded) a diagnostic fault may be set.

At 706, the method includes determining if the clutch has begun to disengage. In one example, a motor position sensor may be used to make the clutch disengagement determination. For instance, if the motor sensor indicates that the motor is rotating back towards the kiss point from the fully engaged point, clutch disengagement may be affirmed. In another example, shaft speed sensors, attached to the shafts coupled to the plates in the locking clutch may be used to determine when the clutch begins to disengage. In such an example, when the speeds of the shafts start to deviate from an equivalent value it may be determined that the clutch disengagement has begun.

If it is determined that the clutch has not begun to disengage (NO at 706) the method moves to 708. At 708, the method includes sustaining electric power delivery to the clutch motor at the first rate. Conversely, if it is determined that the clutch has begun to disengage (YES at 706) the method proceeds to 710. At 710, the method comprises increasing the electric power delivered to the clutch motor to re-engage the clutch. For instance, the controller may be operated to increase the amount of power transferred from a power source (e.g., energy storage device).

At 712, the method includes reducing the electric power delivered to the clutch motor at a second rate which is less than the first rate. Again, the controller may be used to modulate the flow of power from the power source to the clutch motor. In this way, the rate of power transfer to the locking clutch may be iteratively reduced to increase the energy efficiency of clutch engagement and decrease the number of times the clutch begins to disengage.

At 714, the method again determines if the locking clutch has begun to disengage. Motor speed or locking clutch shaft speed may be used to determine when clutch disengagement has started, similar to step 706.

If it is determined that locking clutch disengagement has not begun (NO at 714), the method moves to 716. At 716, the method includes sustaining electric power delivery to the clutch motor at the second rate.

Conversely, if it is determined that locking clutch disengaged has started (YES at 714), the method moves to 718 where the method includes increasing the electric power delivered to the clutch motor to re-engage the locking clutch.

At 720, the method includes reducing the power delivered to the clutch motor at a third rate that is less than the second rate. In this way, the rate of power reduction may again be reduced, to reduce the number of times the clutch reaches the disengagement point to increase clutch performance.

At 722, the method determines whether or not to unlock the locking clutch. In one example, operator input may be used to determine when to unlock and lock the clutch. For instance, an operator may actuate a button, a switch, or other suitable input device and responsive to the interaction with the input device the controller may generate a clutch unlocking command. In other scenarios, the clutch unlocking command may be programmatically generated based on conditions such as vehicle traction, vehicle speed, ambient temperature, and the like. If it is determined that the locking clutch should be unlocked (YES at 722), the method moves to 724 where the method includes operating the clutch motor to unlock the locking clutch. For example, the power delivered to the motor may be discontinued. Conversely, if it is determined that the clutch should not be unlocked (NO at 722), the method proceeds to 726. At 726, the method includes continuing the cycles of iterative reductions in the rate of reduction of the power delivered to the clutch motor. In one example, the rate of electric power reduction may be iteratively reduced by a predetermined value. Alternatively, the rate of electric power reduction may be iteratively reduced by a dynamic value. The dynamic value may be established based on system operating conditions such as a duration of each power reduction iteration, vehicle speed, vehicle traction, etc.

FIG. 8 illustrates a timing diagram 800 of a use-case locking clutch control strategy for a driveline system, such as the driveline systems, shown FIGS. 1-2. In each plot of the timing diagram, time is indicated on the abscissa. The ordinates for plots 802 and 804 indicate the locking clutch command and locking clutch configuration, respectively. The ordinates for plot 806 indicates the level of power delivered to the clutch motor.

At t1, a locking clutch engagement command is generated or received at the controller. Responsive to receiving the engagement command, power is delivered to the motor at value P1. This power delivery, in turn, begins to initiate clutch engagement as the clutch moves from the unlocked position to the locked position from t1 to t2. When the clutch reaches the locked position, the power delivered to the clutch is reduced at a first rate 808. The power delivered to the clutch is reduced at the first rate, until the clutch begins to disengage at t3.

Responsive to sensing of clutch disengagement, the power delivered to the motor is increased at t3. At t4 the clutch again reaches the fully locked position. Next, the power delivered to the clutch is reduced at a second rate 810 that is less than the first rate, until the clutch begins to again disengage at t5. Responsive to the clutch beginning to disengage, the power delivered to the motor is again increased. Next, the power delivered to the clutch is reduced at a third rate 812 that is less than the second rate, until the controller receives or generates a clutch disengagement command at t7. The cyclical drop in motor power (corresponding to clutch actuation force) shown in FIG. 8 enables the clutch to be efficiently held in an engaged configuration. The sensor layout described herein allows the clutch's disengagement point to be rapidly and confidently established to carry out this efficient clutch holding strategy.

It will further be understood, the clutch's locking cycle may be conceptually divided into sequential stages during which the rate of power delivered to the is iteratively decreased. To elaborate, t1 may be a first stage, the period between t1 and t2 may be a second stage, and so on.

The technical effect of the driveline system and IAD locking clutch control technique is an increase in the energy efficiency of the locking clutch during locking operation. Further, the IAD control system described herein decreases clutch control latency and decreases electromagnetic interference when compared to IAD systems that include a controller spaced away from the IAD actuation subsystem.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a method is provided that comprises operating a clutch motor coupled to a differential locking clutch to place the differential locking clutch in a locked configuration; after the differential locking clutch is placed in the locked configuration, reducing electric power delivered to the clutch motor at a first rate; and increasing the electric power delivered to the clutch motor when it is determined that clutch disengagement is occurring based on outputs from a motor position sensor or outputs from shaft speed sensors coupled to a pair of shafts coupled to the differential locking clutch. In one example, the method may further comprise after the electric power delivered to the clutch motor is increased and the differential locking clutch is in the locked configuration, reducing the electric power delivered to the clutch motor at a second rate, wherein the second rate is less than the first rate.

In another aspect, a driveline system is provided that comprises an interaxle differential (IAD) locking clutch configured to selectively inhibit speed differentiation between a first drive axle and a second drive axle; an actuation assembly including a clutch motor that is rotationally coupled to an actuator, wherein the actuator is configured to engage and disengage the IAD locking clutch; and a controller including instructions stored in memory executable by a processor that, when a clutch engagement command is received or generated by the controller, cause the controller to: after the IAD locking clutch is placed in a locked configuration, reduce electric power delivered to the clutch motor at a first rate; and increase an electric power delivered to the clutch motor when it is determined that clutch disengagement is initiated based on a rotational speed of the clutch motor or rotational speeds of shafts coupled to clutch plates in the IAD locking clutch.

In yet another aspect, a method for operating a driveline system is provided that comprises during a locking cycle of an interaxle differential (IAD) locking clutch, iteratively decreasing a rate of electric power reduction in the electric power supplied to a clutch motor coupled to the IAD locking clutch; wherein: in a first stage of the locking cycle, the IAD locking clutch is placed in a locked configuration by supplying an electric power to the clutch motor within a predetermine range; in a second stage of the locking cycle, the electric power supplied to the clutch motor is reduced by a first rate. In one example, the method may further include discontinuing the locking cycle when a command to unlock the IAD locking clutch is generated or received by a controller. In yet another example, the method may further include, in a third stage of the locking cycle, increasing the electrical power supplied to the clutch motor; and in a fourth stage of the locking cycle, reducing the electric power supplied to the clutch motor by a second rate that is slower than the first rate.

In another aspect, a method is provided that comprises generating a clutch fault according to a variance between an initial engagement position and a lock point position of a clutch motor that occur during engagement of an interaxle differential (IAD) locking clutch coupled to the clutch motor; and activating a clutch fault indicator when the clutch fault is generated; wherein an actuation assembly is coupled to the clutch motor and the IAD locking clutch. Further in one example, the method may further comprise, prior to generating the clutch fault, capturing the lock point position using a motor position sensor directly coupled to the clutch motor. In yet another example, the method may further comprise, prior to generating the clutch fault and capturing the lock point position, determining the lock point position according to a drop in motor speed that is determined using the motor position sensor during engagement of the IAD locking clutch. In another example, the method may further comprise generating an actuation assembly fault according to a speed of the clutch motor during engagement of the IAD locking clutch and activating an actuation assembly fault indicator when the actuation assembly fault is generated. In another example, the method may further comprise, prior to generating the actuation assembly fault, determining the speed of the clutch motor using a motor position sensor directly coupled to the clutch motor.

In another aspect, a driveline system is provided that comprises an interaxle differential (IAD) rotationally coupled to a first drive axle and a second drive axle; an IAD locking clutch configured to selectively inhibit speed differentiation between the first and second drive axles; an actuation assembly including a clutch motor that is rotationally coupled to an actuator, wherein the actuator is configured to engage and disengage the IAD locking clutch; and a controller including instructions stored in memory executable by a processor that, during engagement of the IAD locking clutch via the clutch motor and the actuator, cause the controller to: trigger a clutch fault indicator responsive to generation of a clutch fault according to a variance between an initial engagement position of a clutch motor and a lock point position that occur during engagement of the IAD locking clutch coupled to the clutch motor.

In yet another aspect, a method for operation of a driveline system is provided that comprises a method for operation of a driveline system is provided that comprises determining an initial engagement position of a clutch motor according to a drop in motor speed via a motor position sensor that is coupled to the clutch motor, during engagement of an IAD locking clutch by the clutch motor; capturing a lock point position of the clutch motor using the motor position sensor; generating a clutch fault when a variance between the initial engagement position and the lock point position exceeds a threshold value; and activating a clutch fault indicator when the clutch fault is generated. In one example, the method may further comprise determining a speed of the clutch motor using the motor position sensor; and generating an actuation assembly fault according to the speed of the clutch motor during engagement of the IAD locking clutch and activating an actuation assembly fault indicator when the actuation assembly fault is generated.

In any of the aspects or combinations of the aspects, the electric power delivered to the clutch motor may be increased when the outputs from the motor position sensor indicate that the clutch motor is rotating backwards towards an initial clutch engagement point and wherein the motor position sensor may be coupled directly to the clutch motor.

In any of the aspects or combinations of the aspects, the electric power delivered to the clutch motor may be increased when the outputs from the shaft speed sensors indicate that the shaft speeds are not equivalent.

In any of the aspects or combinations of the aspects, the differential locking clutch may be an interaxle differential (IAD) locking clutch.

In any of the aspects or combinations of the aspects, the electric power delivered to the clutch motor may be determined based on shaft speeds from the shaft speed sensors.

In any of the aspects or combinations of the aspects, the electric power delivered to the clutch motor may be determined based on a clutch position from a clutch position sensor.

In any of the aspects or combinations of the aspects, the driveline system may further comprise a motor position sensor coupled directly to the clutch motor and wherein the rotational speed of the clutch motor may be determined based on outputs from the motor position sensor.

In any of the aspects or combinations of the aspects, the driveline system may further comprise a plurality of shaft speed sensors coupled to the shafts that are coupled to the clutch plates and wherein the rotational speeds of the shafts may be determined by outputs from the plurality of shaft speed sensors.

In any of the aspects or combinations of the aspects, the controller may include instructions stored in the memory executable by the processor that, during engagement of the IAD locking clutch via the clutch motor and the actuator, cause the controller to: after the electric power delivered to the clutch motor is increased and the differential locking clutch is in the locked configuration, reduce the electric power delivered to the clutch motor at a second rate, wherein the second rate is less than the first rate.

In any of the aspects or combinations of the aspects, the driveline system may further comprise a gear reduction coupled to the clutch motor and the actuator.

In any of the aspects or combinations of the aspects, the gear reduction may not be backdriveable.

In any of the aspects or combinations of the aspects, the controller may be arranged in a housing of the clutch motor.

In any of the aspects or combinations of the aspects, the actuator may be a ball ramp actuator.

In any of the aspects or combinations of the aspects, the locking cycle may be initiated in response to receiving or generating a command to lock the IAD locking clutch at a controller.

In any of the aspects or combinations of the aspects, the rate of electric power reduction may be iteratively reduced by a predetermined value.

In any of the aspects or combinations of the aspects, the drop in motor speed may be detected during a first IAD locking clutch actuation event distinct from a second IAD locking clutch actuation event that occurs when the lock point position is detected.

In any of the aspects or combinations of the aspects, the lock point position may be captured by a motor position sensor that is coupled directly to the clutch motor when two shafts connected to the IAD locking clutch begin to rotate at the same speed.

In any of the aspects or combinations of the aspects, the lock point position may be captured by a motor position sensor that is coupled directly to the clutch motor when the clutch motor reaches a stall speed.

In any of the aspects or combinations of the aspects, the fault indicator may be a fault flag and the method further comprises generating a service alert in response to activating of the fault flag.

In any of the aspects or combinations of the aspects, the driveline system may further comprise a motor position sensor directly coupled to the clutch motor.

In any of the aspects or combinations of the aspects, the controller may further comprise instructions stored in the memory executable by the processor that, during a first clutch actuation event, cause the controller to: determine the initial engagement position according to a drop in motor speed during engagement of the IAD locking clutch; and instructions stored in the memory executable by the processor that, during a second clutch actuation event, cause the controller to: capture the lock point position using the motor position sensor directly coupled to the clutch motor.

In any of the aspects or combinations of the aspects, the controller may further comprise instructions stored in the memory executable by the processor that, during engagement of the IAD locking clutch via the clutch motor and the actuator, cause the controller to: detect a speed of the clutch motor using the motor position sensor; and generate an actuation assembly fault according to the speed of the clutch motor during engagement of the IAD locking clutch and trigger an actuation assembly fault indicator when the actuation assembly fault is generated.

In any of the aspects or combinations of the aspects, the actuation assembly fault may be a fault of a gear reduction included in the actuation assembly and rotationally coupled to the clutch motor and a ball ramp actuator.

In any of the aspects or combinations of the aspects, the lock point position may be captured by the motor position sensor when two shafts connected to the IAD locking clutch begin to rotate at the same speed.

In any of the aspects or combinations of the aspects, the lock point position may be captured by a motor position sensor when the clutch motor reaches a stall speed.

In any of the aspects or combinations of the aspects, the IAD locking clutch may be a friction clutch.

In any of the aspects or combinations of the aspects, the lock point position may be captured by a motor position sensor, when two shafts connected to the IAD locking clutch begin to rotate at the same speed or when the clutch motor reaches a stall speed.

In any of the aspects or combinations of the aspects, the controller may be positioned in a motor enclosure.

In another representation, a method for operating an actuation assembly for an interaxle differential (IAD) friction clutch is provided that comprises, during a holding stage of friction clutch engagement, iteratively reducing a rate of a decrease in the rate of power delivery.

In yet another representation, a diagnostic method for an IAD system is provided that comprises capturing a first and second motor position value when a locking clutch reaches a kiss point and a fully engaged point; and judging from the variance between the first and second motor position values if the locking clutch or an actuation assembly coupled to the locking clutch are not operating as wanted based on at least two threshold variance values and triggering a fault flag when it is judged that the clutch or the actuation assembly are not operating as wanted.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    operating a clutch motor coupled to a differential locking clutch to place the differential locking clutch in a locked configuration;
    after the differential locking clutch is placed in the locked configuration, reducing electric power delivered to the clutch motor at a first rate; and
    increasing the electric power delivered to the clutch motor when it is determined that clutch disengagement is occurring based on outputs from a motor position sensor or outputs from shaft speed sensors coupled to a pair of shafts coupled to the differential locking clutch.

2. The method of claim 1, wherein the electric power delivered to the clutch motor is increased when the outputs from the motor position sensor indicate that the clutch motor is rotating backwards towards an initial clutch engagement point and wherein the motor position sensor is coupled directly to the clutch motor.

3. The method of claim 1, wherein the electric power delivered to the clutch motor is increased when the outputs from the shaft speed sensors indicate that the shaft speeds are not equivalent.

4. The method of claim 1, further comprising:
    after the electric power delivered to the clutch motor is increased and the differential locking clutch is in the locked configuration, reducing the electric power delivered to the clutch motor at a second rate, wherein the second rate is less than the first rate.

5. The method of claim 1, wherein the differential locking clutch is an interaxle differential (IAD) locking clutch.

6. The method of claim 1, wherein the electric power delivered to the clutch motor is determined based on shaft speeds from the shaft speed sensors.

7. The method of claim 1, wherein the electric power delivered to the clutch motor is determined based on a clutch position from a clutch position sensor.

8. A driveline system, comprising:
- an interaxle differential (IAD) locking clutch configured to selectively inhibit speed differentiation between a first drive axle and a second drive axle;
- an actuation assembly including a clutch motor that is rotationally coupled to an actuator, wherein the actuator is configured to engage and disengage the IAD locking clutch; and
- a controller including instructions stored in memory executable by a processor that, when a clutch engagement command is received or generated by the controller, cause the controller to:
  - after the IAD locking clutch is placed in a locked configuration, reduce electric power delivered to the clutch motor at a first rate; and
  - increase an electric power delivered to the clutch motor when it is determined that clutch disengagement is initiated based on a rotational speed of the clutch motor or rotational speeds of shafts coupled to clutch plates in the IAD locking clutch.

9. The driveline system of claim 8, further comprising a motor position sensor coupled directly to the clutch motor and wherein the rotational speed of the clutch motor is determined based on outputs from the motor position sensor.

10. The driveline system of claim 8, further comprising a plurality of shaft speed sensors coupled to the shafts that are coupled to the clutch plates and wherein the rotational speeds of the shafts are determined by outputs from the plurality of shaft speed sensors.

11. The driveline system of claim 8, wherein the controller includes instructions stored in the memory executable by the processor that, during engagement of the IAD locking clutch via the clutch motor and the actuator, cause the controller to:
- after the electric power delivered to the clutch motor is increased and the differential locking clutch is in the locked configuration, reduce the electric power delivered to the clutch motor at a second rate, wherein the second rate is less than the first rate.

12. The driveline system of claim 8, further comprising a gear reduction coupled to the clutch motor and the actuator.

13. The driveline system of claim 12, wherein the gear reduction is not backdriveable.

14. The driveline system of claim 8, wherein the controller is arranged in a housing of the clutch motor.

15. The driveline system of claim 8, wherein the actuator is a ball ramp actuator.

16. A method for operating a driveline system, comprising:
- during a locking cycle of an interaxle differential (IAD) locking clutch, iteratively decreasing a rate of electric power reduction in the electric power supplied to a clutch motor coupled to the IAD locking clutch;

wherein:
- in a first stage of the locking cycle, the IAD locking clutch is placed in a locked configuration by supplying an electric power to the clutch motor within a predetermine range;
- in a second stage of the locking cycle, the electric power supplied to the clutch motor is reduced by a first rate.

17. The method of claim 16, further comprising discontinuing the locking cycle when a command to unlock the IAD locking clutch is generated or received by a controller.

18. The method of claim 16, wherein the locking cycle is initiated in response to receiving or generating a command to lock the IAD locking clutch at a controller.

19. The method of claim 16, wherein the rate of electric power reduction is iteratively reduced by a predetermined value.

20. The method of claim 16, further comprising:
- in a third stage of the locking cycle, increasing the electrical power supplied to the clutch motor; and
- in a fourth stage of the locking cycle, reducing the electric power supplied to the clutch motor by a second rate that is slower than the first rate.

* * * * *